(12) United States Patent
Pedersen et al.

(10) Patent No.: US 8,909,269 B2
(45) Date of Patent: Dec. 9, 2014

(54) INTERFERENCE CONTROL

(75) Inventors: Klaus Ingemann Pedersen, Aalborg (DK); Troels Emil Kolding, Klarup (DK)

(73) Assignee: Nokia Siemens Networks Oy, Espoo (FI)

( * ) Notice: Subject to any disclaimer, the term of this patent is extended or adjusted under 35 U.S.C. 154(b) by 316 days.

(21) Appl. No.: 13/500,370

(22) PCT Filed: Oct. 5, 2009

(86) PCT No.: PCT/EP2009/062915
§ 371 (c)(1),
(2), (4) Date: May 21, 2012

(87) PCT Pub. No.: WO2011/042043
PCT Pub. Date: Apr. 14, 2011

(65) Prior Publication Data
US 2012/0238302 A1    Sep. 20, 2012

(51) Int. Cl.
*H04W 52/14* (2009.01)
*H04W 52/24* (2009.01)

(52) U.S. Cl.
CPC .................................. *H04W 52/242* (2013.01)
USPC .............. 455/501; 455/7; 455/522; 455/63.1; 370/332; 375/144; 375/260

(58) Field of Classification Search
CPC ............ H04W 52/242; H04W 52/243; H04W 52/244; H04W 52/245; H04W 52/246; H04W 52/247; H04W 52/248; H04W 52/30; H04W 52/38; H04W 52/50
USPC ........... 455/69, 522, 446, 423, 501, 513, 525, 455/449, 452.2, 67.11, 509, 63.1; 370/252, 370/329, 335, 342, 328, 332; 375/260, 346, 375/317, 144
See application file for complete search history.

(56) References Cited

U.S. PATENT DOCUMENTS

| | | | | |
|---|---|---|---|---|
| 6,438,379 | B1 * | 8/2002 | Gitlin et al. | 455/449 |
| 8,559,325 | B2 * | 10/2013 | Damnjanovic et al. | 370/252 |
| 2008/0084848 | A1 * | 4/2008 | Jard et al. | 370/332 |
| 2008/0146154 | A1 * | 6/2008 | Claussen et al. | 455/63.1 |
| 2008/0161033 | A1 * | 7/2008 | Borran et al. | 455/522 |
| 2009/0046667 | A1 * | 2/2009 | Pelletier et al. | 370/335 |
| 2009/0080499 | A1 * | 3/2009 | Yavuz et al. | 375/144 |
| 2009/0082026 | A1 * | 3/2009 | Yavuz et al. | 455/446 |
| 2009/0086861 | A1 * | 4/2009 | Yavuz et al. | 375/346 |
| 2009/0137241 | A1 * | 5/2009 | Yavuz et al. | 455/423 |
| 2010/0029212 | A1 * | 2/2010 | Malladi et al. | 455/63.1 |
| 2010/0190447 | A1 * | 7/2010 | Agrawal et al. | 455/63.1 |
| 2011/0177808 | A1 * | 7/2011 | Grokop et al. | 455/423 |

(Continued)

OTHER PUBLICATIONS

TSG-RAN Working Group 4 (Radio) Meeting #51, R4-091976, San Francisco May 4-8, 2009, Vodafone, AT&T, Alcatel Lucent, PicoChip Designs, Qualcomm Europe, "LTE-FDD HeNB Interference Scenarios", (4 pages).

*Primary Examiner* — Tan Trinh
(74) *Attorney, Agent, or Firm* — Harrington & Smith

(57) ABSTRACT

Controlling interference towards a first access node from uplink transmissions made by a user device to a second access node, wherein said controlling is carried out on the basis of an indication of the pathloss between said first and second access nodes without using any measurement of pathloss between said user device and said first access node.

16 Claims, 2 Drawing Sheets

(56) References Cited

U.S. PATENT DOCUMENTS

2011/0218010 A1* 9/2011 Hoymann et al. ............ 455/513
2012/0184203 A1* 7/2012 Tulino et al. ...................... 455/7
2013/0021974 A1* 1/2013 Ji et al. .......................... 370/328
2013/0100912 A1* 4/2013 Cai et al. ....................... 370/329
2013/0237262 A1* 9/2013 Borran et al. ................. 455/501

* cited by examiner

INTERFERENCE CONTROL

The present invention relates to controlling interference towards a first access node from uplink transmissions made by a user device to a second access node.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include GSM (Global System for Mobile) EDGE (Enhanced Data for GSM Evolution) Radio Access Networks (GERAN), Universal Terrestrial Radio Access Networks (UTRAN), and evolved Universal Terrestrial Radio Access Networks (EUTRAN).

In a cellular radio access network, the frequency spectrum resources for uplink transmissions in neighbouring cells are generally configured not to overlap with each other with the aim of minimising interference within the cellular network. However, there are situations where uplink transmissions made by a user device to one access node can cause interference towards another access node because of overlap of spectrum resources for the two access nodes. One example of such a situation is where a low power access node is designed to provide data services to user devices within a relatively small geographical area within a relatively wide geographical area served by a higher power access node, and the frequency spectrum resources used for uplink transmissions to the low power access node are the same as the frequency spectrum resources used for uplink transmissions to the higher power node.

One aim of the present invention is to provide a simple technique for controlling interference towards a first access node from uplink transmissions made by a user device to a second access node.

The present invention provides a method comprising: controlling interference towards a first access node from uplink transmissions made by a user device to a second access node, wherein said controlling is carried out on the basis of an indication of the pathloss between said first and second access nodes without using any measurement of pathloss between said user device and said first access node.

In one embodiment, the method comprises receiving at the second access node from the user device information indicating the current transmission power of the user device, and transmitting from said second access node to said user device a power control command determined on the basis of said information and said indication of the pathloss between said first and second access nodes.

In one embodiment, the power control command comprises a command to increase transmission power by a predetermined amount or a command to decrease transmission power by a predetermined amount.

In one embodiment, said first access node is a relatively high transmission power node and said second access node is a relatively low transmission power node.

In one embodiment, said first access node serves a relatively large geographical area and said second access node serves a relatively small geographical area.

In one embodiment, the method further comprises: predefining a plurality of maximum allowed transmission power values for a range of possible values of pathloss between said first and second access nodes; measuring path loss between said first and second access nodes; and selecting a maximum allowed transmission power value corresponding to a measured value of pathloss between said first and second access nodes.

In one embodiment, said range of possible values of pathloss is divided into a plurality of sub-ranges; and a single, respective maximum allowed transmission power value is predetermined for each sub-range.

The present invention also provides an apparatus configured to carry out any of the above-described methods.

The present invention also provides an apparatus comprising: a processor and memory including computer program code, wherein the memory and the computer program are configured to, with the processor, cause the apparatus at least to perform any of the above-described methods.

The present invention also provides a computer program product comprising program code means which when loaded into a computer controls the computer to perform any of the above-described methods.

The present invention also provides a system comprising: at least first and second access nodes and a user device, wherein the second access node is configured to control interference towards a first access node from uplink transmissions made by said user device to said second access node, wherein said controlling is carried out on the basis of an indication of the pathloss between said first and second access nodes without using any measurement of pathloss between said user device and said first access node.

Hereunder an embodiment of the present invention will be described, by way of example only, with reference to the following drawings, in which.

Figure 1:
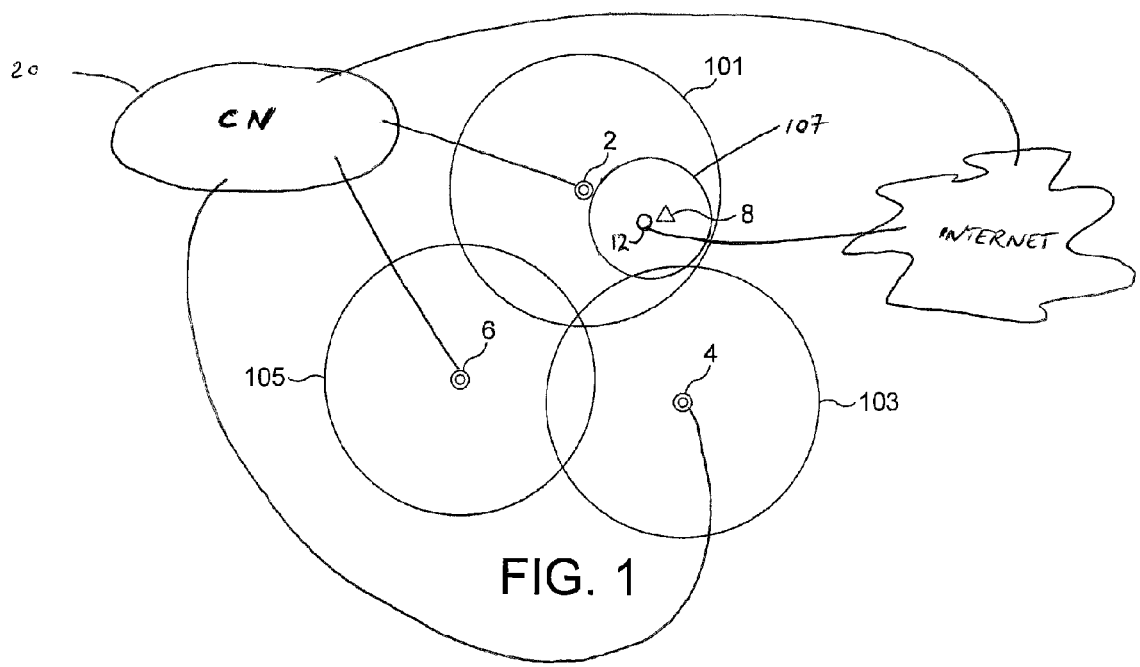
FIG. 1 illustrates a radio access system within which an embodiment of the invention may be implemented, which access system includes a number of macro cells each served by a respective base station (macro eNodeB) and a low power node (Home eNodeB) serving an area within one of the macro cells.

FIG. 1 shows a communications system including a radio access network comprising a first macro access node 2 with a first coverage area 101, a second macro access node 4 with a second coverage area 103 and a third macro access node 6 with a third coverage area 105. Furthermore FIG. 1 shows user equipment 8 which is configured to communicate with at least one of the access nodes 2, 4, 6. These coverage areas may also be known as cellular coverage areas or cells where the access network is a cellular communications network. Also shown in FIG. 1 is a relatively low power access node 12 with a coverage area 107 significantly smaller than the three macro access nodes 2, 4, 6.

Figure 2:
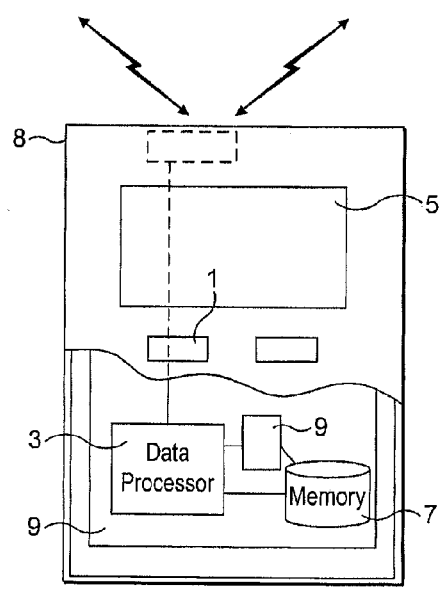
FIG. 2 illustrates a user equipment shown in FIG. 1 in further detail.

FIG. 2 shows a schematic partially sectioned view of an example of user equipment 8 that may be used for accessing the macro access nodes and/or the low power node 12 and thus the communication system via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part 7 and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE 8 may comprise appropriate connectors (either wired or wireless) to other devices and/or for connecting external accessories, for example hands-free equipment, thereto.

Figure 3:
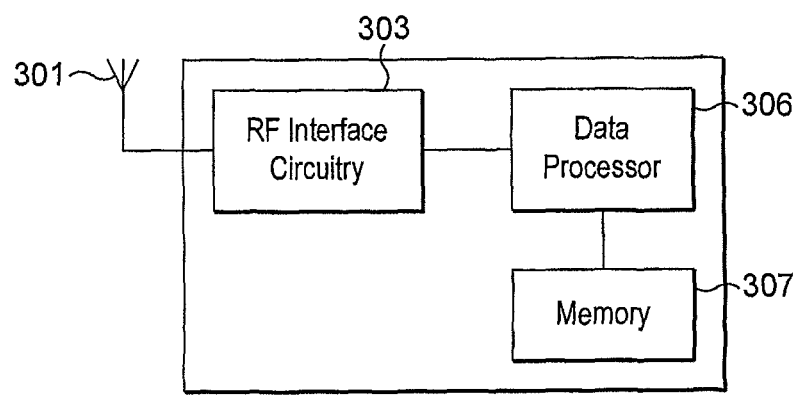
FIG. 3 illustrates an apparatus suitable for implementing an embodiment of the invention at a macro eNodeB or a Home eNodeB of the radio system shown in FIG. 1.

FIG. 3 shows an example of apparatus for use at either the macro access nodes 2, 4, 6 or at low power access node 12.

The apparatus 2 comprises a radio frequency antenna 301 configured to receive and transmit radio frequency signals, radio frequency interface circuitry 303 configured to interface the radio frequency signals received and transmitted by the antenna 301 and the data processor 167. The radio frequency interface circuitry may also be known as a transceiver. The apparatus may also comprise a data processor configured to process signals from the radio frequency interface circuitry 303, control the radio frequency interface circuitry 303 to generate suitable RF signals to communicate information to the UE 8 via the wireless communications link. The access node further comprises a memory 307 for storing data, parameters and instructions for use by the data processor 305.

It would be appreciated that both the UE 8 and the apparatus shown in FIGS. 2 and 3 respectively and described above may comprise further elements which are not directly involved with the embodiments of the invention described hereafter.

Although the following describes an embodiment of the invention using evolved node B (eNB) access nodes operating within an EUTRAN according to an LTE (Long Term Evolution) system, further embodiments of the invention may use any base station, node B and evolved node B suitable for communicating with a user equipment capable of communication in that access network, and further comprising data processing and storage capacity suitable for carrying the operations as described below.

In this embodiment, macro access node 2 and low power access node 12 are designed to operate using the same LTE uplink frequency carrier, i.e. they are configured to receive uplink SC-FDMA (Single Carrier Frequency Division Multiple Access) transmissions within the same frequency carrier, which frequency carrier is made up of groups of orthogonal sub-carriers. UE 8 is located in the coverage area 107 associated with low power access node 12 and in the coverage area 101 associated with macro eNB 2. There is a risk that some common orthogonal subcarriers will be used at the same time for both uplink transmissions made by UE 8 to low power access node 2 and uplink transmissions from another user device to macro access node 2. Accordingly, there is a risk that uplink transmissions from UE 8 to low power node 12 will interfere with uplink transmissions made to macro access node 2 by another user device (not shown), particularly, when UE 8 is in a location close to macro access node 2 but at the edge of the coverage area 107 served by the low power access node 12. This kind of situation may arise, for example, where the cost to UE 8 of accessing data services via low power access node 12 is less than accessing the same data services via macro access node 2, and UE 8 is configured to preferentially access data services via low power access node 2, whenever possible.

Because of the above-mentioned possibility of overlapping frequency spectrum resources, there is also a similar risk that uplink transmissions made by another user device (not shown) to macro access node 2 will interfere with uplink transmissions made by UE 8 to low power access node 12, particularly when said another user device is making uplink transmissions to macro access node 2 from a location close to low power access node 2 but near to the edge of the coverage area 101 of macro access node 2. This kind of situation can arise, for example, when only a relatively small restricted group of users are permitted to access data services via low power access node 12, i.e. when the low power access node 12 is a closed subscriber group (CSG) access node.

With the aim of preventing uplink transmissions from UE 8 to the low power access node 12 causing excessive interference towards uplink transmissions to the macro access node 2, the low power access node 12 controls the transmission power of transmissions from UE 8 taking into account an indicator of the pathloss between the low power access node 12 and the macro access node 2. If there happen to be other access nodes (other macro access nodes or other low power access nodes) that share uplink frequency spectrum resources with the low power access node 12, the low power access node 12 also measures pathloss between the low power access node 12 and each of those other access nodes, and controls the transmission power of transmissions from UE 8 to low power access node 12 on the basis of the smallest of the measured values of pathloss.

When the measured pathloss value is relatively low, the low power access node 12 acts to restrict the maximum transmission power of transmissions from UE 8 to low power access node 12 to a relatively low level. On the other hand, when the measured pathloss value is relatively high, the low power access node 12 places lower restrictions on the level of transmission power for transmissions from UE 8 to low power access node 12.

A maximum allowed transmission power is determined on the basis of the measured value of pathloss between the low power access node 12 and the macro access node 2 (or the smallest measured value of pathloss if the low power access node 12 makes measurements of pathloss for a plurality of access nodes that share uplink frequency spectrum resources with the low power access node 12). This determination takes into account the conflicting aims of (i) reducing the amount of interference towards uplink transmissions by other user devices to other access nodes, and (ii) achieving a good quality of service for uplink transmissions from UE 8 to low power access node 12. The extent to which a balance is achieved between these two conflicting aims depends on predetermined parameters set individually for the low power access node 12, or set for a wider group of access nodes including the low power access node 12. For example, where the macro access nodes 2, 4, 6 and the low power access node 12 are run by the same operator, the parameters that define the maximum allowable transmission power for a given pathloss value can be set for the whole of the network run by that operator.

One option is to calculate the maximum allowable transmission power with reference to one or more predetermined pathloss threshold values. In a very simple example, a single threshold value is set, and the maximum allowable transmission power has one of two predetermined values depending on whether the measured pathloss value is greater or less than the single threshold value. Another option is to predefine a plurality of pathloss ranges and a respective maximum allowable transmission power for each range, and then to select the maximum allowable transmission power for the range in which the measured pathloss value happens to fall. For both these options, the threshold values/ranges and/or the maximum allowable transmission power values for each range could be fixed or could be configurable to allow more flexibility.

Another option is predefine a continuous function expressing the relationship between maximum allowable transmission power and pathloss. Parameters of this function could also be fixed (e.g. defined in a table) or could be configurable to allow more flexibility.

Once the maximum allowable transmission power is determined, the low power access node 12 controls the transmission power of uplink transmissions from UE 8 to the low power access node 12 such that the transmission power does not exceed the maximum allowable transmission power.

According to one example, this is achieved by using closed loop power control corrections; the low power access node 12 determines power control commands for the UE 8 taking into account the maximum allowable transmission power value determined on the basis of the pathloss measurement. A power control command could have a value indicating a command to increase transmission power by a predetermined amount, or could have a value indicating a command to decrease transmission power by a predetermined amount. The UE 8 controls its transmission power according to a formula that includes the value of at least the most recently received power control commands as one variable. Power headroom measurement reports from UE 8 to the low power access node 12 are an indication of the transmission power of the UE 8 and allow the low power access node 12 to monitor the transmission power of the UE 8. These reports are useful in deciding which power control command to send to UE 8.

Where low power access node 12 is configured to control the transmission power of UE 8 according to an open loop power control technique, the low power access node 12 acts to prevent the transmission power of uplink transmissions from the UE 8 to the low power access node exceeding the maximum allowable transmission power by setting the open loop control parameters accordingly. Alternatively, the low power access node can use higher layer signalling to inform UE 8 that it is not allowed to exceed a specific maximum transmission power.

According to the technique of the present invention, the low power access node 12 does not use measurements made by UE 8 of the pathloss between UE 8 and any other access node, such as macro access node 2, to control interference for the whole of the time for which UE 8 is connected to the low power access node 12. Accordingly, the technique of the present invention avoids the need for UE 8 to use power resources to make such measurements, and avoids the need to use resources to report the results of such measurements from UE 8 to the low power access node 12. On the other hand, the technique of taking into account the pathloss between the low power access node 12 and other access nodes such as macro access node 2 is more effective at achieving a good balance between controlling interference and achieving good quality of service than defining a fixed cap on the transmission power of uplink transmissions from the UE 8 to the low power access node 12 irrespective of the proximity of any other access node that might share uplink frequency spectrum resources with the low power access node 12.

In the above-described embodiment, the low power access node 12 may, for example, may be a small base station that uses an available high-speed fixed Internet connection as backhaul towards the core network (CN) 20 for the macro access network that comprises macro access nodes 2, 4 and 6. The low power access node 12 may be designed to provide large amounts of data at a relatively low cost in a relatively small area including a high density of users, such as a large office building. The area served by the low power access node 12 may be a femto cell.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
controlling interference towards a first access node from uplink transmissions made by a user device to a second access node;
implementing said controlling on the basis of an indication of the pathloss between said first and second access nodes, without using any measurement of pathloss between said user device and said first access node; and
predefining a plurality of maximum allowed transmission power values for a range of possible values of pathloss between said first and second access nodes; wherein said range of possible values of pathloss is divided into a plurality of sub-ranges; and a single, respective maximum allowed transmission power value is predetermined for each sub-range.

2. A method according to claim 1, further comprising: receiving at the second access node from the user device information indicating the current transmission power of the user device, and transmitting from said second access node to said user device a power control command determined on the basis of said information and said indication of the pathloss between said first and second access nodes.

3. A method according to claim 2, wherein the power control command comprises a command to increase transmission power by a predetermined amount or a command to decrease transmission power by a predetermined amount.

4. A method according to claim 1, wherein said first access node is a relatively high transmission power node and said second access node is a relatively low transmission power node.

5. A method according to claim 1 where said first access node serves a relatively large geographical area and said second access node serves a relatively small geographical area.

6. A method according to claim 1, comprising: measuring path loss between said first and second access nodes; and selecting a maximum allowed transmission power value corresponding to a measured value of pathloss between said first and second access nodes.

7. An apparatus configured to carry out the method of claim 1.

8. An apparatus comprising: a processor and memory including computer program code, wherein the memory and the computer program are configured to, with the processor, cause the apparatus at least to perform the method of claim 1.

9. A non-transitory computer readable medium comprising program code means which when loaded into a computer controls the computer to perform a method according to claim 1.

10. An apparatus comprising at least one processor and at least one memory including computer program code, the at least one memory and the computer program code being configured, with the at least one processor, to cause the apparatus to perform at least the following:
control interference towards a first access node from uplink transmissions made by a user device to a second access node;
implement said controlling on the basis of an indication of the pathloss between said first and second access nodes, without using any measurement of pathloss between said user device and said first access node; and
predefine a plurality of maximum allowed transmission power values for a range of possible values of pathloss between said first and second access nodes; wherein said range of possible values of pathloss is divided into a plurality of sub-ranges; and a single, respective maximum allowed transmission power value is predetermined for each sub-range.

11. The apparatus of claim 10, wherein the at least one memory and the computer program code are further configured, with the at least one processor, to cause the apparatus to perform receiving at the second access node from the user device information indicating the current transmission power of the user device, and transmitting from said second access node to said user device a power control command determined on the basis of said information and said indication of the pathloss between said first and second access nodes.

12. The apparatus of claim 11, wherein the power control command comprises a command to increase transmission power by a predetermined amount or a command to decrease transmission power by a predetermined amount.

13. The apparatus of claim 10, wherein said first access node is a relatively high transmission power node and said second access node is a relatively low transmission power node.

14. The apparatus of claim 10 where said first access node serves a relatively large geographical area and said second access node serves a relatively small geographical area.

15. The apparatus of claim 10 wherein the at least one memory and the computer program code are further configured, with the at least one processor, to cause the apparatus to perform at least the following:
measuring path loss between said first and second access nodes; and
selecting a maximum allowed transmission power value corresponding to a measured value of pathloss between said first and second access nodes.

16. A system comprising: at least first and second access nodes and a user device, wherein the second access node is configured to:
control interference towards a first access node from uplink transmissions made by said user device to said second access node;

implement said controlling on the basis of an indication of the pathloss between said first and second access nodes without using any measurement of pathloss between said user device and said first access node; and predefine a plurality of maximum allowed transmission power values for a range of possible values of pathloss between said first and second access nodes; wherein said range of possible values of pathloss is divided into a plurality of sub-ranges; and a single, respective maximum allowed transmission power value is predetermined for each sub-range.

* * * * *